United States Patent [19]

Malafouris

[11] 4,133,335

[45] Jan. 9, 1979

[54] FOLDING TRAY PORTABLE COOKING UNIT

[75] Inventor: Dannie O. Malafouris, Portland, Oreg.

[73] Assignee: Barbecue Time, Inc., Portland, Oreg.

[21] Appl. No.: 743,848

[22] Filed: Nov. 22, 1976

[51] Int. Cl.² ............... F24C 1/16; A47J 37/00; F24B 3/00

[52] U.S. Cl. .................. 126/9 R; 126/2; 126/25 A; 126/25 B; 126/25 C; 220/96

[58] Field of Search ............ 126/9 R, 9 B, 25 R, 126/25 A, 25 B, 25 C, 2, 3, 337 A, 339; 99/339, 340, 372; D7/107, 108, 109, 110; 220/96, 347, 351, 345; 16/116 R, 119

[56] References Cited

U.S. PATENT DOCUMENTS

| | | | |
|---|---|---|---|
| 1,124,395 | 1/1915 | Cottrell | 220/345 |
| 1,998,343 | 4/1935 | Teller et al. | 126/339 |
| 2,172,524 | 9/1930 | Stevens | 126/9 B |
| 3,105,483 | 10/1963 | Bryan | 126/25 A X |
| 3,124,266 | 3/1964 | Morgan | 220/96 X |
| 3,167,040 | 1/1965 | Byars, Sr. et al. | 126/25 B |
| 3,641,922 | 2/1972 | Nachazel et al. | 126/9 B X |
| 3,791,368 | 2/1974 | Hunt | 126/9 R X |
| 3,974,821 | 8/1976 | Storandt | 126/25 B |
| 4,046,132 | 9/1977 | White | 126/9 R |

*Primary Examiner*—William F. O'Dea
*Assistant Examiner*—Harold Joyce
*Attorney, Agent, or Firm*—Eugene D. Farley

[57] ABSTRACT

A portable cooking unit of the type having dished fuel trays pivotally joined to a central frame for movement between raised fuel lighting positions and lowered cooking positions, and having removable grills comprises improved support means for supporting the grills releasably.

Bails, which are attached to the fuel trays for supporting them in their lowered positions, have indented medial portions allowing a user's hand to be placed under them for moving the fuel trays to their raised positions when they are hot. The bails are movable between carrying positions for carrying the cooking unit and support positions for supporting the fuel trays when cooking, by means of inwardly facing extensions located at their extremities. The extensions fit rotatably in bores located in the fuel trays allowing the bails to be moved over camming surfaces into detents which retain them in their support positions.

2 Claims, 6 Drawing Figures

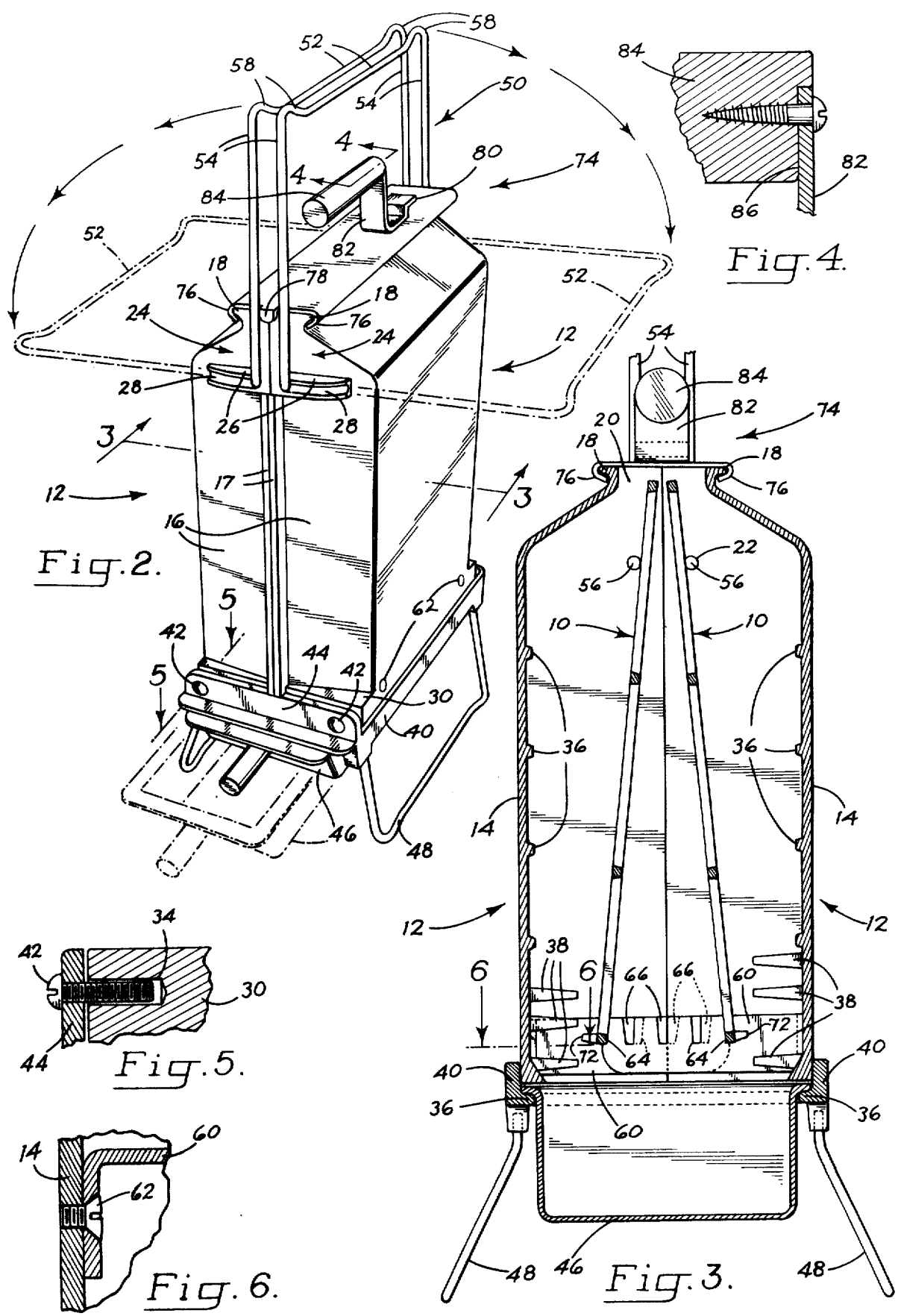

FOLDING TRAY PORTABLE COOKING UNIT

BACKGROUND OF THE INVENTION

This invention relates to improvements in a portable cooking unit which is foldable for ignition and smothering of the fuel.

Hibachi type cooking units having dished fuel trays pivotally mounted on a central frame and releasably carrying grills have become popular due to their rapid starting time and capability of smothering unburned fuel for re-use. In cooking units of this type, the fuel trays are positioned in lowered, substantially horizontal positions and filled partially with fuel, such as charcoal. The grills then are placed in the units in a laterally spaced relation with the bottom of the fuel trays, enclosing the fuel therebetween.

The fuel trays, along with the grills and fuel, are moved to raised, substantially vertical positions wherein the sides of the fuel trays abut each other. A lighting source, placed in a lighter drawer located beneath the fuel trays, is ignited and the flame is drawn upwardly over the fuel by a draft created by flue openings formed in the tops of the fuel trays. After the fuel is ignited, the fuel trays are moved to their lowered positions where they are supported by C-shaped bails which are joined pivotally to the fuel trays, and which are movable between carrying positions substantially parallel to the fuel trays and support positions substantially normal to the fuel trays. The grills then are moved to selected positions of elevation for cooking.

After cooking, the grills again are moved to their lowered positions and the fuel trays are raised. A damper is positioned over the draft openings sealing the cooking unit and smothering the fuel.

While the operation of the prior art cooking units of this type is quite satisfactory, they do have several shortcomings which prevent their maximum utilization.

The grills are mounted in a manner which permits settling of the fuel downwardly when the fuel trays are moved from their lowered to their raised, fuel-igniting positions. Thus the fuel is concentrated in the lower portions of the trays and is not ignited uniformly.

Also, when in the cooking positions, the slopes of the grills causes certain foods, such as hot dogs and sausages, to roll off of the inner edges of the grills.

Another shortcoming of the prior art units is that no provisions are made for moving the grills between their lower and upper positions in the grill support means when the grills are hot. As a result a separate implement, such as a pair of pliers, must be used for this purpose.

Yet another shortcoming of the prior art cooking units is that once the fuel trays become hot it is difficult to raise them for smothering the fuel. While the bails can be used for this purpose, it is difficult to grasp them firmly when they are positioned on the ground.

Accordingly, it is the general purpose of the present invention to provide such a cooking unit wherein the grills are tightly engaged, preventing their lateral and angular movement when the unit is folded.

It is another object of the present invention to provide such a cooking unit wherein the grills have means for controlling the position and location of the food as it is cooked.

It is a further object of the present invention to provide such a cooking unit wherein the grill can easily be manipulated for repositioning in the unit when it is hot.

It is a still further object of the present invention to provide such a cooking unit wherein the fuel trays are supported on a 4-point platform for stability.

It is a still further object of the present invention to provide such a cooking unit wherein the fuel trays can easily be moved between their lowered and raised positions when they are hot.

THE DRAWINGS

The manner in which the foregoing and other objects of the invention are accomplished will be apparent from the accompanying specification and claims, considered together with the accompanying drawings wherein:

FIG. 2 is a perspective view of the cooking unit in its closed position;

FIG. 3 is a fragmentary sectional view taken on the line 3—3 of FIG. 2;

FIG. 4 is a fragmentary sectional view taken on the line 4—4 of FIG. 2;

FIG. 5 is a fragmentary sectional view taken on the line 5—5 of FIG. 2; and

FIG. 6 is a fragmentary sectional view taken on the line 6—6 of FIG. 3.

GENERAL STATEMENT OF THE INVENTION

Figure 1:
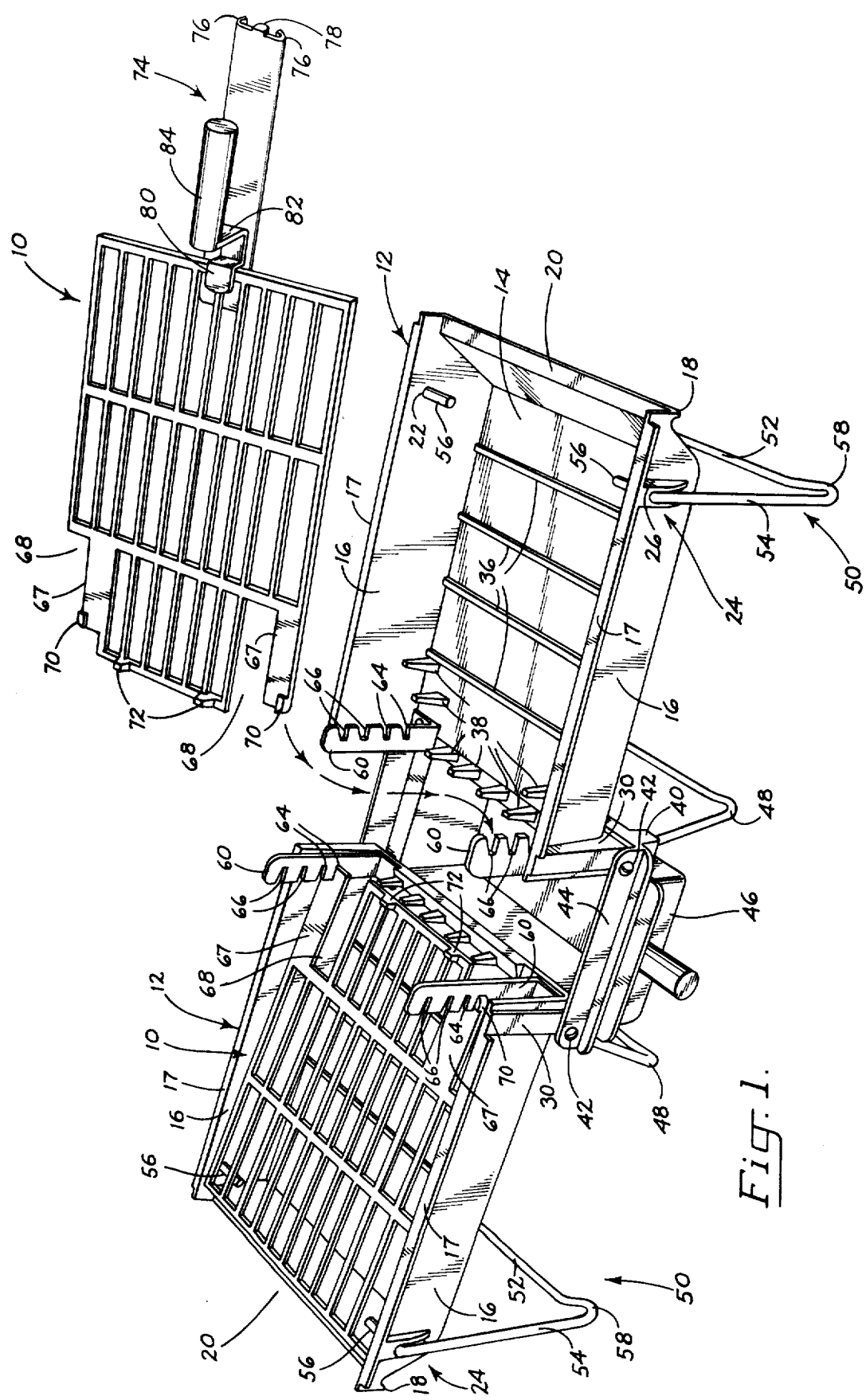
FIG. 1 is a perspective view of the herein described cooking unit in its open position with one of the grills removed to show concealed construction.

The cooking unit of the present invention generally comprises a frame having dished fuel trays pivotally mounted thereto for movement between raised, substantially vertical lighting positions and lowered, substantially horizontal cooking positions. The grills are positioned removably in a laterally spaced relation with the bottom surfaces of the fuel trays for movement therewith. The grills are supported at an angle in grill support means which comprise notches for receiving the grills, with at least a portion of the notches arranged for supporting the grills rigidly against lateral or angular movement. Thus fuel placed between the grills and the fuel trays will not displace the grills when the fuel trays are raised, allowing a flame used for igniting the fuel to pass through all of the fuel and ignite it uniformly from top to bottom.

C-shaped bails are mounted to the fuel trays pivotally by means of inwardly facing extensions located at the extremities of the bails and which fit into bores in the fuel trays. The bails are movable between carrying positions, which substantially are parallel to the fuel trays, and support positions, which substantially are normal to the fuel trays. The extremities move outwardly in the bores when the bails are moved over camming surfaces into detents which fix them releasably in their support positions. Raised feet located at the corners of the bails provide stable 4-point support of the fuel trays, and indented medial portions are arranged for receiving a user's hand thereunder for moving the bails when the fuel trays are hot.

A damper which closes draft openings formed at the tops of the fuel trays, when the fuel trays are in their raised positions, includes grill engagement means. Thus the grills can be manipulated with the damper for repositioning in the cooking unit when the grills are hot. A thermally insulated handle attached to the damper allows manipulation of the damper when it, too, is hot.

DESCRIPTION OF A PREFERRED EMBODIMENT

Referring to FIGS. 1 and 2 of the drawings, the cooking unit of the present invention generally comprises grills 10 removably positionable in dished fuel trays 12. The fuel trays are foldable between raised, substantially vertical lighting positions and lowered, substantially horizontal cooking positions.

The fuel trays 12, which hold fuel such as charcoal briquettes, comprise rectangular bottoms 14 and perpendicular sides 16. Outwardly facing lips 17 extend from the terminal edges of the sides. The bottoms angle inwardly at the upper ends of the fuel trays terminating in outwardly facing lateral rims 18. Thus when the fuel trays are in their raised positions, with their abutting lips in adjacency sealing them at their sides, flue openings 20 are formed in their upper ends.

Bores 22 pass through the sides 16 of the fuel trays near their upper ends for receiving bails. Located outwardly adjacent to each bore 22 is a raised elongated nub 24 which is joined laterally to the sides 16. Each nub includes a contoured camming surface 26 on its upper face and defines a medial detent 28 on its outer face which terminates above its associated bore 22.

Rails 36 are located laterally on the inwardly facing surfaces of the bottoms 14 for maintaining even longitudinal distribution of the fuel when the fuel trays are moved to their raised positions. Preferably the rails are shallow and extend across the entire width of the fuel trays.

Truncated pyramidal teeth 38 are located at the lower ends of the fuel trays for keeping the fuel from dropping out of the fuel trays when they are in their raised positions. The teeth preferably extend inwardly a distance equal to approximately one-half the height of sides 16.

The lower ends of the fuel trays include bases 30 which have planar surfaced sides. Bores 34, FIG. 5, are located in each end of the bases for receiving the pivot means upon which the fuel trays move.

The fuel trays are mounted to a frame 40 by pivot means, such as screws 42. The screws extend through threaded openings in a flange 44, which is located at one end of the base, into pivotal engagement with bores 34 in the fuel trays. Thus the pivot means serves both as a pivot and a mount for the fuel trays.

The frame comprises a peripheral box defining a rectangular central open area. Tracks 36 extending inwardly from the sides of the frame slidably carry a lighter drawer 46 which is configured for receiving a lighting charge for igniting the fuel. Referring to FIG. 3, it will be noted that when the lighter drawer is fully inserted into the frame it encloses the lower ends of the fuel trays in their raised positions. However, when the drawer is opened partially, to the position shown by the dashed in FIG. 2, the convective draft caused by a lighted charge in the lighter drawer will draw air into the lighter drawer, up to the fuel trays and out of flue openings 20.

U-shaped legs 48 which extend from joinder with the sides of the frame support the cooking unit. The legs angle outwardly as they extend downwardly giving a wide base for support. They are positioned to place the frame off of the supporting surface sufficiently for sliding movement of lighter drawer 46.

Bails 50, attached pivotally to the upper end of the fuel trays, are movable between carrying positions, for carrying the cooking unit when folded, and support positions, for supporting the fuel trays in their lowered positions for cooking. The bails are formed of cylindrical rods and each comprises a medial portion 52 which is joined at each end to perpendicular legs 54.

The extremities of the legs define inwardly facing extensions 56 which fit into bores 20 for joining the bails to the fuel trays. Preferably the extensions extend inwardly into the fuel trays approximately one inch. The bails are arranged for urging the extensions inwardly, so that when the bails are moved from their carrying positions to their support positions the legs 54 must be deflected outwardly over camming surfaces 26 into detents 28. As a result the bails snap into their support positions when the legs are moved past center on the detents.

Raised feet 58 interconnect the legs 54 and the medial portions 52 of the bails. The feet are arranged so that when they are located on a supporting surface a person's hand can be placed under the medial portions. Thus the bails can be used for raising the fuel trays when they are hot without touching them. Also the feet provide a 4-point platform which stabilizes the cooking unit, particularly when it is placed on an irregular surface.

Grill support means are located within the fuel trays at their lower ends. They comprise multi-slotted brackets 60 which are attached to the fuel trays by means such as screws 62, FIG. 6. Two brackets are located in each fuel tray with opposed brackets offset from one another to allow moving of the trays to their raised positions.

Slots are positioned in the brackets at a slight inwardly facing angle. In the embodiment illustrated, four slots are provided giving four grill heights for cooking at selected elevations from the fire. The lower two slots 64 are rectangular in plan having parallel gripping surfaces spaced apart for receiving the grills tightly eliminating lateral or angular movement of the grills when the fuel trays are moved from their lowered to their raised positions. Thus when fuel is placed under the grills in the fuel trays and the fuel trays are raised, the grills do not move inwardly. Because of the inward angles of the grills the fuel contained in the fuel trays is spread out and retained at its upper end. Thus when the fuel is lit the flames also spread out at the top licking all of the fuel and igniting it uniformly. It will be noted that when the grills are in the lowest slot of the brackets, extensions 56 of the bails support the grills and cooperate in maintaining their angles, FIG. 1.

The upper slots 66 primarily are used for supporting the grills when cooking and are tapered to facilitate inserting and removing the grills. Thus when the angle of the grills is not critical it is easier to place the grills in the brackets.

The grills 10 are of the standard hibachi type and comprise planar rectangular surfaces having a plurality of rectangular openings. The grills have mounting tabs 67 at each corner configured for a tight fit into slots 64 of brackets 60. One of the tabs on each grill is offset to align with the brackets which are offset in the fuel trays so that the grills may be installed in the brackets. Openings 68 are located in the grills adjacent to the tabs to accommodate the opposed brackets when the fuel trays are located in their raised positions.

Located on the outside edge of each tab is a raised guide 70 which aids in inserting the grills squarely into the slots. Also, stops 72 are located on the inner margins of the grills to prevent food which is being cooked from sliding off. Round articles, such as hot dogs, particularly are susceptible to rolling off of the edge of the sloped grill without such stops.

A damper 74 slidably fits over rims 18 at the top of the fuel trays for closing flue openings 20. The damper has reversely bent edge margins 76 which are arranged to engage rims 18 snugly in a manner for squeezing the abutting lips 17 of the fuel trays together. A downwardly facing tab 78 on the end of the damper engages the fuel trays, centering the damper so that it completely seals the flue openings.

Grill engagement means, such as clip 80, is located on the upper surface of the damper and is arranged for engaging the grills 10. The clip includes an upright extension 82 having a thermally insulated handle 84 attached to its upper extremity. To prevent the handle from rotating when the grill engagement means is used for manipulating the grills around the hot cooking unit, it has a notch 86, FIG. 4, in its end configured for mating with extension 82. Thus the damper may be used even when hot for manipulation of the grills to selected cooking positions in the brackets or placing one of the grills above the other in the same set of brackets for warming rolls or buns simultaneously with cooking of meat. In addition the handle may be used for carrying the cooking unit when the fuel trays are in their raised position and the damper is installed.

OPERATION

The manner of use of the hereindescribed cooking unit is as follows:

With the fuel trays 12 located in their lowered positions, FIG. 1, and the grills 10 removed, fuel is placed in the bottoms of the fuel trays filling them approximately half way. The grills then are placed in the lowermost slots 64 of the brackets 60 enclosing the fuel between the grills and the bottoms of the fuel trays and the fuel trays are moved to their raised positions. However, damper 74 is not installed, or is left partially open, leaving the flue openings 20 uncovered.

To light the fuel, a lighting charge, such as crumpled papers soaked in lighter fluid, is placed in the lighter drawer 46 and lit. When lighting the fuel the lighter drawer is left partially open, to the dashed line position in FIG. 2. Thus a draft is created through the fuel trays and out of flue openings 20. As a result the flames are drawn upwardly over the fuel.

It will be noted that the inwardly facing angle of the grills with respect to the fuel trays spreads the fuel at the top permitting the flames to pass upwardly through it. The tight fit of the grills in the rectangular slots 64 in cooperation with extensions 56 of the bails position the grills in a manner for retaining this angle accurately without inward movement of the grills by the fuel. In addition rails 36 and teeth 38 cooperate to maintain the vertical and horizontal distribution of the fuel in the fuel trays.

Once the igniting charge is spent and the fuel is ignited, the lighter drawer 46 is closed and the fuel trays are moved to their lowered positions. To accomplish this the bails 50 first are moved to their support positions. It will be noted that extensions 56 are deflected outwardly as the legs 54 pass over camming surfaces 26. The legs then snap positively into detents 28 positioning them in their support positions and retaining them there.

The bails now serve as handles for lowering the fuel trays which are hot. The user's hand which fits into the deflected medial portion 52 of the bails can be removed after feet 58 are resting on the supporting surface and supporting the cooking unit.

The grills then are positioned in selected slots 64, 66 of the grill support means for cooking. The grill engagement means 80 are used for this purpose as the grill also is hot. The grill is engaged by clip 80 and moved by grasping handle 84. The cooking unit then is used in the conventional manner for cooking. The slopes of the grills cause the grease from the food being cooked to run downwardly to their inner edges where it drops into the lighter drawer 46. Thus grease does not drop onto the fuel and cause flaring. If hot dogs are being cooked, they are positioned laterally so that the angled orientation of the grills urges them downwardly until the lowermost hot dog contacts stops 72. By moving the lowermost hot dog to the top end of the grill those remaining rotate approximately ¼ turn as they move downwardly. Thus by progressively repositioning them, they are cooked evenly.

After cooking, the grills are lowered to one of the lower slots 64 by using the grill engagement means and the fuel trays are moved back to their raised positions. Again the user's hand can be placed under the medial portions 52 of the bails for moving the hot fuel trays. As the fuel trays are raised, the remaining fuel is held between the grills and the bottom of the fuel trays by rails 36 and teeth 38. Again the tight fit of the grills in slots 64 prevents inward movement of the grills preventing passage of the fuel downwardly. However, as the fuel trays are raised the ash drops downwardly and is deposited into the lighter drawer.

Damper 74 is placed over rims 18 sealing the fuel trays together. As a result the remaining fuel is smothered and can be re-used several times.

When the fuel has been smothered completely, the lighter drawer is removed and the ash emptied from it. The unit then is ready for storage or re-use.

Having thus described my invention in a preferred embodiment, I claim:

1. A portable cooking unit for use with charcoal or similar fuel comprising in combination:
   (a) a frame,
   (b) dished fuel trays pivotally joined to the frame and positionable between a raised substantially vertical lighting position in which the fuel trays are located adjacent one another and a lowered substantially horizontal cooking position, said fuel trays having bores passing through their upper ends,
   (c) the fuel trays having flue openings formed in their upper ends allowing air passage therethrough when the fuel trays are in their raised position,
   (d) grill support means located within the dished fuel trays,
   (e) perforate grills having inner portions removably positionable in the grill support means in a manner to provide a fuel retention space between each tray and grill for receiving the fuel,
   (f) generally C-shaped bails having inwardly facing extensions in alignment with each other and arranged for being received pivotally within the bores in the fuel trays in a manner such that the bails are positionable between carrying positions, substantially parallel to the fuel trays for carrying the cooking unit when the fuel trays are in their raised positions, and support positions, substantially normal to the fuel trays for supporting the fuel trays when the fuel trays are in their lowered positions, said aligned extensions passing through said bores and extending into the fuel trays so that said extensions support the outer portions of the grills when the grills are positioned in the grill support means.

2. The combination according to claim 1, said extensions supporting said grill outer portions regardless of the position of said bails.

* * * * *